United States Patent Office 2,797,237
Patented June 25, 1957

2,797,237

LOWER ALKANOIC ACID ESTERS OF 3,7,9-TRIMETHYL-6-DECEN-1-YN-3-OL

James A. Birbiglia, Nutley, George O. Chase, Hawthorne, and Julius Galender, West Paterson, N. J., assignors to Hoffmann-La Roche Inc., Nutley, N. J., a corporation of New Jersey No Drawing. Application December 31, 1956, Serial No. 631,445

6 Claims. (Cl. 260—488)

This invention relates to novel chemical compounds and to a method for preparing such compounds. More particularly, the invention relates to lower alkanoic acid esters of 3,7,9-trimethyl-6-decen-1-yn-3-ol and 3,7,9-trimethyl-1,6-decadien-3-ol. A method for producing these esters is also encompassed by the invention.

The novel unsaturated esters are produced by esterifying 3,7,9-trimethyl-6-decen-1-yn-3-ol with the acid anhydride of a lower alkanoic acid in the presence of an esterification catalyst to obtain 3,7,9-trimethyl-6-decen-1-yn-3-yl lower alkanoic acid ester and catalytically hydrogenating the foregoing ester with one mol of hydrogen to obtain 3,7,9-trimethyl-1,6-decadien-3-yl lower alkanoic acid ester.

The esterification step of the synthesis may be effected by reacting 3,7,9-trimethyl-6-decen-1-yn-3-ol with a lower alkanoic acid anhydride such as acetic anhydride, propionic anhydride, butyric anhydride, etc. in the presence of an esterification catalyst at about room temperature (e. g. about 25° to 30° C.). The reaction may be carried out, if desired, in a solvent which is inert to the reactants, for example, a hydrocarbon solvent such as petroleum naphtha. Acid esterification catalysts such as p-toluenesulfonic acid and phosphoric acid are preferred, but other esterification catalysts may be used.

The 3,7,9-trimethyl-6-decen-1-yn-3-yl lower alkanoic acid ester obtained as described above is subjected to reaction with hydrogen in the presence of a hydrogenation catalyst which exerts a selective influence toward the hydrogenation of the triple bond to a double bond. An example of a selective hydrogenation catalyst of the type described is disclosed by Lindlar, Helvetica Chimica Acta 35, 446 (1952). Preferred is a 5% palladium-on-calcium carbonate catalyst partially deactivated by treatment with a lead salt as described on page 450 of the Lindlar article. If desired, quinoline may be used to further enhance the selectivity of the catalyst as shown by the cited publication.

The compounds of this invention are useful as odoriferous materials which may be employed in the preparation of perfumes and other scented compositions. The novel esters possess fruity fragrances, generally reminiscent of bergamot, but shading over into a woody note. The 3,7,9-trimethyl-6-decen-1-yn-3-yl lower alkanoic acid esters are in addition useful as intermediates for the production of 3,7,9-trimethyl-1,6-decadien-3-yl lower alkanoic acid esters.

Certain of the compounds of the invention exhibit geometric isomerism and such isomeric forms are within the scope of the invention.

The examples which follow are illustrative of the invention.

Example 1

438 grams of 3,5-dimethyl-1-hexen-3-ol were stirred with 1500 cc. of concentrated aqueous hydrochloric acid (37% by weight HCl concentration) at room temperature for 30 minutes. The oil layer was separated, washed twice, each time with 500 cc. of water, and dried over calcium chloride. The product obtained, 1-chloro-3,5-dimethyl-2-hexene, had $n_D^{25}$=1.448.

In a five-liter flask there was placed three liters of benzene, 429 g. of ethyl acetoacetate and 162 g. of sodium methylate. 428 g. of 1-chloro-3,5-dimethyl-2-hexene were added at 60° C. within 30 minutes, and stirring was continued for six hours at 60–70° C. The reaction mixture was washed with two liters of water and the benzene was distilled off under a vacuum of 100 mm. to yield 3-carbethoxy-6,8-dimethyl-5-nonen-2-one as a straw-colored oil.

The entire quantity of 3-carbethoxy-6,8-dimethyl-5-nonen-2-one was dissolved in 2 liters of ethyl alcohol. To this were added 200 g. of solid potassium hydroxide and 200 cc. of water. The mixture was stirred for 4 hours at 40–50° C. To the resulting solution of the potassium salt of 3-carboxy-6,8-dimethyl-5-nonen-2-one was then added concentrated aqueous hydrochloric acid (37% by weight HCl) from a separatory funnel until the solution was strongly acid. Thirty minutes were required for the addition. The solution was then stirred an additional hour at 50° C.

The reaction mixture was diluted with two liters of water and the oil layer was removed by means of a separatory funnel. The aqueous portion was extracted with 500 cc. of benzene. The combined oils were washed neutral with water and fractionated. The product, 6,8-dimethyl-5-nonen-2-one, distilled at 120° C. at 35 mm., $n_D^{25}$=1.4432.

In 1.5 liters of liquid ammonia there was dissolved 41.4 g. of metallic sodium. Acetylene gas was passed into the blue colored solution, until the color changed to white. The addition of acetylene was continued for an extra 30 minutes. Then a solution of 252 grams of 6,8-dimethyl-5-nonen-2-one, dissolved in 250 cc. of ethyl ether, was dropped in within 45 minutes. The stirring was continued for fifteen hours while a slow stream of acetylene was bubbled into the reaction mixture.

The ammonia was thereupon evaporated from the reaction mixture with the aid of a slow stream of nitrogen. The residue was poured into two liters of 5% sulfuric acid. The oil layer was removed and washed neutral with water. On fractionation, 3,7,9-trimethyl-6-decen-1-yn-3-ol was obtained in a fraction distilling at 72° C. at 0.35 mm., $n_D^{25}$=1.4598.

To 200 ml. of acetic anhydride were added slowly, with stirring, 100 ml. of 98 to 99% formic acid through a dropping funnel. The temperature of the mixture was maintained at a maximum temperature of 30° C. by cooling with an ice and water bath. The addition required about 10 minutes. Considerable energy was evolved and the mixture darkened in color. When no further energy was evolved, there were added 1.78 grams of 85% phosphoric acid and 194.3 grams (1.0 mol) of 3,7,9-trimethyl-6-decen-1-yn-3-ol. The reaction mixture was permitted to stand for 5 days at room temperature. The product was then stirred with 200 ml. of cold water and diluted with 200 ml. of petroleum naphtha. Upon settling, the aqueous phase was drawn off and the product was washed with 200 ml. of cold water. The excess acidity was destroyed by washing with 10% sodium carbonate solution to a pH of 11 and then with sufficient water until neutral to red litmus. The product, 3,7,9-trimethyl-6-decen-1-yn-3-yl formate, was dried, the solvent was removed and the residue was distilled in high vacuum, B. P. = 67 to 69° C./0.2 mm., $n_D^{25}$=1.4543 to 1.4552.

Example 2

222.3 grams (1.0 mol) of 3,7,9-trimethyl-6-decen-1-yn-3-yl formate, 223 ml. of petroleum naphtha and 2.23 grams of Pd–CaCO₃–Pb catalyst (Lindlar, page 450, cited above) were placed in a five-liter, three-neck flask equipped with a sealed stirrer, hydrogen addition tube and thermometer. The hydrogenator was flushed with nitrogen and then with hydrogen. The stirrer was started and the hydrogenation was carried out at 8 to 10 inches of water pressure at a temperature of 15° C. until no more hydrogen was absorbed. The theoretical amount of hydrogen was absorbed. The reaction mixture was tested for acetylenic bodies with ammoniacal silver nitrate with negative results. The catalyst was removed by filtration and the solvent was removed under reduced pressure. The 3,7,9-trimethyl-1,6-decadien-3-yl formate was distilled in vacuo, B. P.=109–112° C./0.4 mm., $n_D^{25}$=1.4525 to 1.4535.

*Example 3*

To 194.3 grams of 3,7,9-trimethyl-6-decen-1-yn-3-ol and 1.78 grams of 85% phosphoric acid were added slowly 123.5 grams (1.2 mols) of acetic anhydride. The reaction temperature was held between 25 and 30° C. by means of a cooling bath and the addition of acetic anhydride required about 30 minutes. The reaction was quite energetic and the mixture darkened in color when no further energy was evolved. The reaction mixture was permitted to stand overnight at room temperature.

The reaction mixture was diluted with 200 ml. of petroleum naphtha and 200 ml. of cold water were added with stirring. The mixture was transferred to a separatory funnel, the aqueous phase was drawn off and the excess acidity was destroyed by washing with 10% sodium carbonate solution until the reaction mixture showed a pH of 11. The washing was continued until the water washes were neutral to red and blue litmus. The product, 3,7,9-trimethyl-6-decen-1-yn-3-yl acetate, was dried, the solvent was removed under reduced pressure and the product was then distilled under a high vacuum, B. P.=84 to 87° C./0.1 mm., $n_D^{25}$=1.4525 to 1.4535.

*Example 4*

236.3 grams (1.0 mol) of 3,7,9-trimethyl-6-decen-1-yn-3-yl acetate in 236 ml. of petroleum naphtha were selectively hydrogenated in the presence of 2.4 grams of Pd–CaCO₃–Pb catalyst as described in Example 2 above. The 3,7,9-trimethyl-1,6-decadien-3-yl acetate thus obtained had B. P.=123 to 124° C./0.6 mm., $n_D^{25}$=1.4505 to 1.4515.

*Example 5*

3,7,9-trimethyl-6-decen-1-yn-3-yl propionate was prepared using 194.3 grams (1.0 mol) of 3,7,9-trimethyl-6-decen-1-yn-3-ol, 156.2 grams (1.2 mols) of propionic anhydride and 1.78 grams of 85% phosphoric acid according to the procedure described in Example 3. The product had B. P.=82 to 83° C./0.2 mm., $n_D^{25}$=1.4525 to 1.4535.

*Example 6*

250.4 grams (1.0 mol) of 3,7,9-trimethyl-6-decen-1-yn-3-yl propionate in 250 ml. of petroleum naphtha were hydrogenated in the presence of 2.5 grams of Pd–CaCO₃–Pb catalyst according to the procedure described in Example 2. The product, 3,7,9-trimethyl-1,6-decadien-3-yl propionate, had B. P.=72 to 75° C./0.2 mm., $n_D^{25}$=1.4505 to 1.4515.

*Example 7*

3,7,9-trimethyl-6-decen-1-yn-3-yl isobutyrate, B. P.=83 to 86° C./0.2 mm., $n_D^{25}$=1.4494 to 1.4505, was prepared from 194.3 grams (1.0 mol) of 3,7,9-trimethyl-6-decen-1-yn-3-ol, 189.8 grams (1.2 mols) isobutyric anhydride and 1.78 grams of 85% phosphoric acid according to the procedure described in Example 3.

*Example 8*

3,7,9-trimethyl-1,6-decadien-3-yl isobutyrate, B. P.=113 to 115° C./0.1 mm., was prepared by selective hydrogenation of 264.4 grams (1.0 mol) of 3,7,9-trimethyl-6-decen-1-yn-3-yl isobutyrate in 265 ml. of petroleum naphtha in the presence of 2.65 grams of Pd–CaCO₃–Pb catalyst according to the procedure described in Example 2.

*Example 9*

3,7,9-trimethyl-6-decen-1-yn-3-yl butyrate, B. P.=85 to 88° C./0.15 mm.; $n_D^{25}$=1.4524 to 1.4534; was prepared from 194.3 grams (1.0 mol) of 3,7,9-trimethyl-6-decen-1-yn-3-ol, 189.8 grams (1.2 mols) butyric anhydride and 1.78 grams of 85% phosphoric acid according to the procedure described in Example 3.

*Example 10*

3,7,9-trimethyl-1,6-decadien-3-yl butyrate, B. P.=97 to 98° C./0.2 mm.; $n_D^{25}$=1.4505 to 1.4515 was prepared by selective hydrogenation of 264.4 grams (1.0 mol) of 3,7,9-trimethyl-6-decen-1-yn-3-yl butyrate according to the procedure described in Example 2.

We claim:
1. 3,7,9-trimethyl-6-decen-1-yn-3-yl lower alkanoic acid esters.
2. 3,7,9-trimethyl-6-decen-1-yn-3-yl formate.
3. 3,7,9-trimethyl-6-decen-1-yn-3-yl acetate.
4. 3,7,9-trimethyl-6-decen-1-yn-3-yl propionate.
5. 3,7,9-trimethyl-6-decen-1-yn-3-yl butyrate.
6. 3,7,9-trimethyl-6-decen-1-yn-3-yl isobutyrate.

References Cited in the file of this patent

Locquin et al.: Compt. Rend. 174 (1922), pp. 1427–9, 1551–3 and 1711–3.
Lacey: J. Chem. Soc. (London), 1954, pp. 827–39.

UNITED STATES PATENT OFFICE

CERTIFICATE OF CORRECTION

Patent No. 2,797,237                                          June 25, 1957

James A. Birbiglia et al.

It is hereby certified that error appears in the printed specification of the above numbered patent requiring correction and that the said Letters Patent should read as corrected below.

Column 4, line 50, beginning with "References Cited" strike out all to and including "pp. 827-39." in line 53, same column.

Signed and sealed this 1st day of October 1957.

(SEAL)
Attest:

KARL H. AXLINE
Attesting Officer

ROBERT C. WATSON
Commissioner of Patents